INVENTORS.
JOSEPH C. KLOPE
AND ROBERT G. CHAPMAN
BY
ATTORNEY

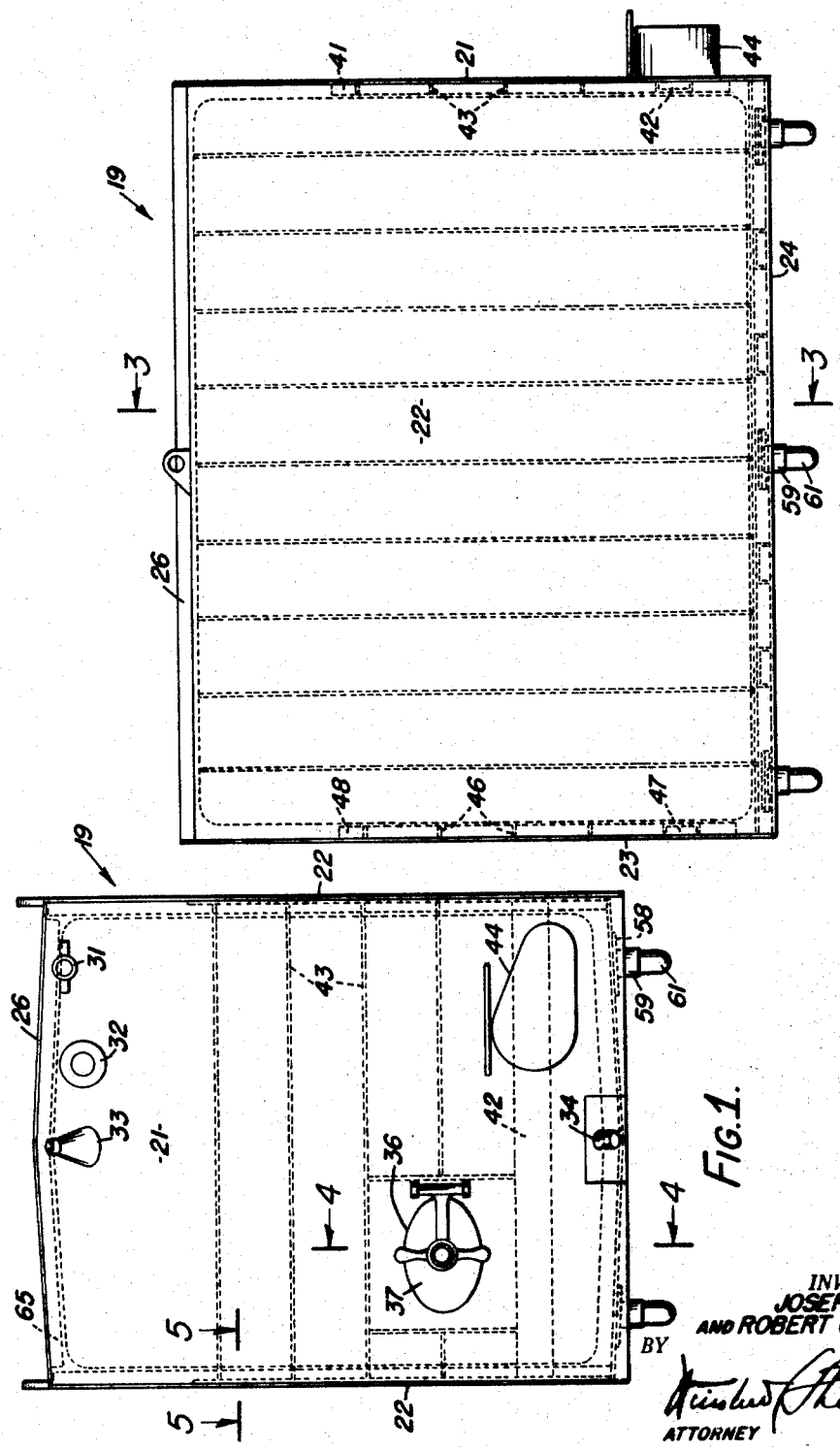

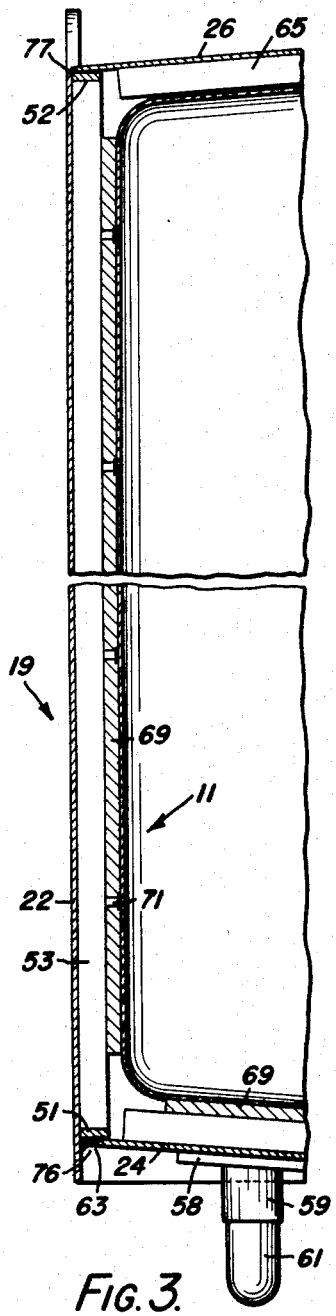
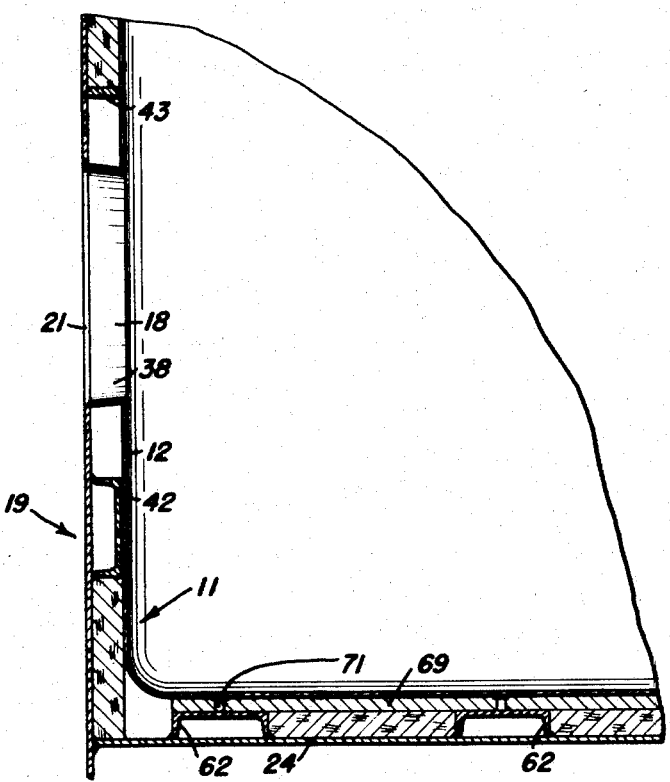
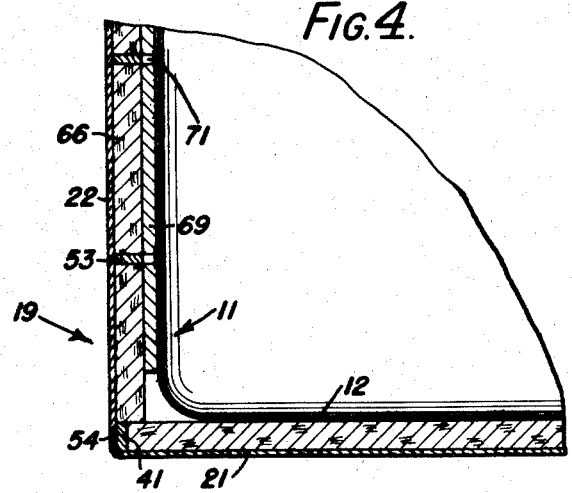
FIG. 3.
FIG. 4.
FIG. 5.
INVENTORS.
JOSEPH C. KLOPE
AND ROBERT G. CHAPMAN

2,869,751

INSULATED STORAGE TANK AND METHOD OF MAKING A STORAGE TANK

Joseph C. Klope and Robert G. Chapman, Rochester, N. Y., assignors to Pfauder Permutit Inc., Rochester, N. Y., a corporation of New York Application September 3, 1954, Serial No. 454,083

2 Claims. (Cl. 220—15)

Our invention relates to storage tanks and more particularly to storage tanks for maintaining milk and other liquids at a desired temperature and a method of making such tanks.

An object of our invention is to provide a storage tank and particularly a method of making storage tanks of the insulated, double wall type wherein the cost of fabrication and erection is reduced.

A further object of our invention is to provide an insulated storage tank of generally rectangular shape to enable the storage of a greater quantity of liquid in the same floor space while at the same time maintaining the cost of fabrication at a minimum.

Another object of our invention is the provision of a generally rectangular tank construction in which the interior storage tank may be made of stainless steel or other non-corrosive materials and the outer tank or protective shell may be made up of relatively strong, inexpensive materials welded together from separately fabricated panels, with the panel which makes up the bottom of the shell being so constructed and arranged that it bears substantially the entire weight of the inner tank.

A further object of our invention is to provide a tank construction and method of making a tank in which the interior wall is made of thin stainless steel sheets which rest on a rigid frame structure constituting part of a rigid exterior shell and, between the shell and the inner stainless steel tank, insulation is provided, the insulation being applied to the interior of the shell between reinforcing bars and the shell being welded together and so constructed that it may be fabricated at a minimum of cost and erected in a minimum of time.

Our invention further contemplates a rectangular insulated storage tank comprising an innner generally rectangular storage tank of thin stainless steel and an outer protective rectangular shell which supports the insulation, the shell being formed in panels for convenient application of the insulation thereto and the separate insulating and reinforcing panels being erected about or extending in enclosing relation to the inner storage tank with the panels welded to each other to the end that the inner storage tank rests on the bottom panel of the shell and all other parts of the shell are for practical purposes free of the walls of the inner storage tank.

Other objects and advantages of our invention will be particularly set forth in the claims and will be apparent from the following description, when taken in connection with the accompanying drawings, in which:

Fig. 1 is a front elevation of the tank structure of our invention showing appurtenances thereto and indicating in dotted lines the inner storage tank of stainless steel and the reinforcing means applied to the front panel of the shell;

Fig. 2 is a side elevation of the tank structure;

Fig. 3 is a sectional view taken substantially on the line 3—3 of Fig. 2 in the direction indicated by the arrows;

Fig. 4 is a sectional view taken substantially on the line 4—4 of Fig. 1 in the direction indicated by the arrows;

Fig. 5 is a sectional view taken substantially on the line 5—5 of Fig. 1 in the direction indicated by the arrows.

Figure 6:
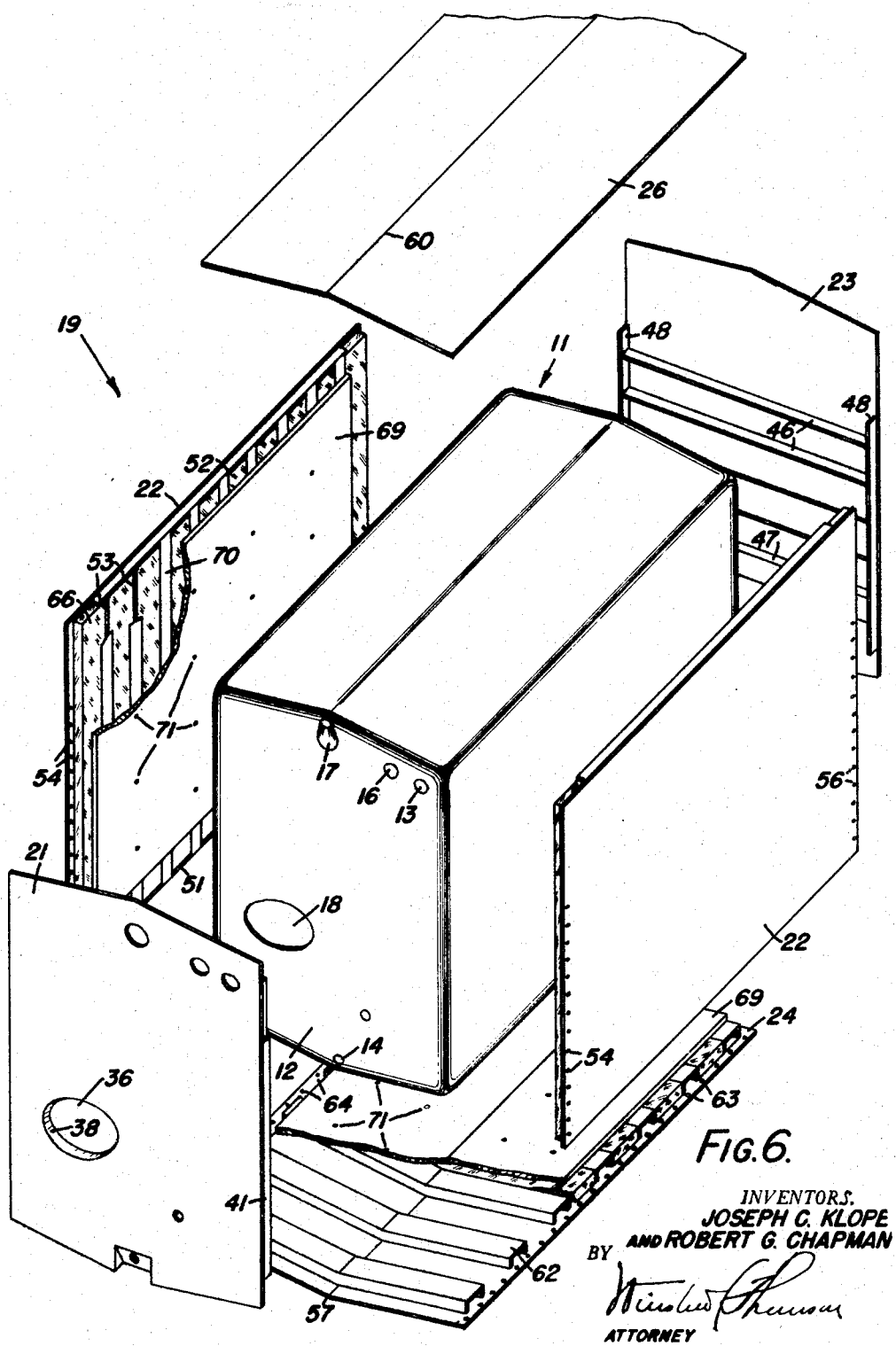
Fig. 6 is a perspective exploded view of the complete tank illustrating one method of erection which may be employed.

The method of fabricating a storage tank and the tank structure of our invention comprises an inner storage tank generally indicated by the numeral 11. The storage tank per se constitutes no part of our present invention except that the bottom wall thereof preferably forms a wide angle, longitudinally extending V for a purpose which will later appear and it is sufficient to state that the tank is designed primarily for the storage of milk. As such, it is made of sheets of stainless steel welded together with the welds ground smooth so as to provide a smooth uninterrupted surface devoid of interior corners to facilitate cleaning.

As shown in Fig. 6, the front wall 12 of the inner stainless steel tank has a fluid inlet 13 adjacent the top of the tank; a fluid outlet 14 adjacent the transverse center of the bottom of the tank in a position such that the tank can be completely drained; an opening 16 closed by an observation glass and adjacent which a light may be mounted to render the interior tank visible; and an opening 17 constituting a combined opening for a vent and a gauge. The front wall of the interior storage tank also includes a manhole opening 18 to enable access to the interior of the storage tank for the purpose of cleaning.

The outer tank shell, generally indicated by the numeral 19, comprises a front panel 21, two side panels 22, a rear panel 23, a bottom panel 24, and a top panel 26. As will presently appear, these panels are separately fabricated units to which insulation is applied and which are then erected in place about the inner storage tank and welded together to provide a unitary shell by the bottom panel of which the inner storage tank is supported but which at all other points is essentially free of the erected shell structure insofar as any substantial weight support is concerned.

The front wall of the shell has an inlet opening 31 connected with the fluid inlet opening 13 of the inner storage tank; a combined observation and glass light opening 32 connected with 16; a combined gauge and vent opening 33 connected with 17; and an outlet valve 34 connected with the outlet 14. The wall of the front panel is cut out to receive an oval metal frame 36 adapted to receive a manhole door 37 which forms through suitable means not shown a sealing contact with the lip 38 (see Fig. 4) of the manhole opening 18. The door per se constitutes no part of our present invention and need not be further considered.

The vertical side edges of the front wall 21 of the shell 19 has bars 41 welded thereto to form attaching flanges for the reception of the side panels 22 as will presently appear. Welded to the inside face of the front panel is a channel 42 and a series of horizontally extending bars 43. The channel 42 and the bars 43 are also welded to the flanges 41 to thus form a rigid front panel shell structure. The channel 42 (see Fig. 1) lies just below and supports the oval metal frame 36. The drive shaft of an agitator which is mounted on the front panel extends into the tank 12, the drive being indicated diagrammatically at 44 (Fig. 1).

The rear panel 23 is formed essentially the same as the front panel of the shell except that it lacks the various cut-outs or openings above described. It includes, however, strengthening bars and channels 46 and 47 and further includes bars 48 at the vertical side edges (see Fig. 6).

The side panels 22 are identical and only one need be described. Each has a bar 51 rigidly welded horizontally along a line spaced from the lower edge of the side panel. The side panel likewise has adjacent its top edge a horizontally welded bar 52. Extending between the bars 51 and 52 and welded thereto and also welded to the inside wall of the panel 22 are vertically extending bars 53. The vertical side edges of the side panels 22 are provided with punched openings 54 and 56 for a purpose which will later appear.

The bottom panel comprises a mild steel sheet which is bent at its longitudinal center 57 so as to allow a low point at which the outlet valve 34 may be attached and so that the longitudinal center line of the inner storage tank may constitute the low point of the inner tank to permit complete drainage of the inner tank. Welded to the under side of the bottom panel are plates 58, in this instance six in number, having leg sockets 59 welded thereto. The leg sockets are threaded and adapted to adjustably receive threaded legs 61. Upon adjustment of the legs the tank may be tilted slightly forwardly so as to bring the outlet opening 14 (Fig. 6) at the lowermost point of the tank.

The bottom panel has a series of transversely extending channels 62 welded thereto and which form a rigid support for the bottom of the inner tank 12. These channels are V-shaped transversely of the bottom panel to conform to the V-shape of the outer sheet of the panel. Adjacent each longitudinal edge the bottom panel 24 has punched openings 63 and 64, the purpose of which will later appear. To allow space for the rows of punched openings, the channels are shorter than the width of the outer plate to which they are welded.

The top panel 26 may comprise two or more sheets of mild steel welded along a line 60 or a single sheet of metal bent at 60 to the under side of which a series of parallel transversely extending bars or strengthening members 65 are welded. In general, any suitable top panel may be employed as it carries no load except insofar as it aids in tying the side panels together.

Fitted between the vertically extending bars 53, for example, on the side panels are relatively thick sheets of an insulating material such as cork. In Fig. 6, the cork has been shown by way of illustration at 66, the insulation being shown more fully in Figs. 3, 4 and 5. The cork sheets are either adhesively applied to all the inner sides of all the panels between adjacent bars or between adjacent channels as in the case of the bottom panel 24, or may be tightly fitted into position between the bars or channels so that the natural resiliency of the cork holds it in position.

Extending over the inner edges of the bars and the inner faces of the channels so as to avoid metal to metal contact between the shell and the inner storage tank are asbestos insulating strips 70 (Fig. 6). It will now be appreciated that substantially the entire area of each of the panels is covered by either cork or asbestos, the asbestos covering all metal parts likely to touch the inner storage tank 11.

Between the side panels 22 and the inner storage tank 12 and between the bottom panel 24 as thus fabricated are sheets of relatively thick plywood or fibreboard. These plywood sheets, while lending some strength and rigidity to the structure and although they have considerable insulating value, are primarily employed as a filler. The particular storage tank illustrated in the drawings is provided with no refrigerant section or panel. It is primarily a holding tank employed to hold milk which has already been cooled for a short interval prior, as an example, to being bottled. When it is desired to employ what is known as a wall cooler, one or more of the plywood sheets 69 may be removed and a wall cooler may be welded to the outer side wall of the inner storage tank. Such wall coolers are well known in the art and in general comprise a sheet of metal forming an enclosure with the outer side wall of the inner storage tank. The wall cooler has an inlet and an outlet for refrigerant and is dimpled and welded through the dimples to the exterior wall of the inner storage tank. Such a wall cooler is shown, for example, in Greene application Serial No. 245,452, filed September 7, 1951, and entitled, "Rectangular Tank for Storage of Milk and the Like," now abandoned.

The plywood sheets may be welded to the exterior walls of the inner storage tank. That is, by piercing the plywood with a series of holes rivet welds may be applied through the holes. However, preferably the plywood sheets are secured to the inner walls of the side panels 22 and the bottom panel 24 by similar means as shown at 71 (Fig. 6). That is, weld holes are made in the plywood to correspond to the positions of the bars and channels and the plywood sheets welded through the holes to these structural elements.

In fabricating a tank, after the inner storage tank 12 has been made the shell comprising the six panels may be separately fabricated and built around the inner tank 12 or the outer shell may be completely fabricated except for the front or rear panel and then the inner tank slid into position. In the preferred method of our invention, the bottom panel 24 is set on its legs in a completely fabricated condition with the plywood applied to the channels 62 as indicated in Fig. 6. The inner tank may then be placed on the plywood so that the tank 12 is completely supported by the bottom panel. It will be particularly noted that the bottom plywood is in two sheets so that it may be placed in a position to conform to the wide angle V of the bottom panel. As previously mentioned, the inner storage tank bottom is V-shaped and when seated in the V of the bottom panel is completely stable requiring no other support.

The side panels 22 completely fabricated with the cork insulation fitted between the bars, the asbestos insulation covering the edges of the bars and the plywood sheets welded to the bars may be placed in position with the horizontal bars 51 lying on the longitudinal edges of the bottom panel. Welds may then be formed through the openings 63 onto the under sides of the bars 51 as shown at 76 in Fig. 3. The top panel 26 completely fabricated may be then placed in position with its longitudinal edges resting on the horizontal top bars 52 of the side panels 22. The top panel 26 may then be welded to the horizontal bars 52 as shown at 77 (Fig. 3). The back panel 48 completely fabricated and with insulation applied thereto as described above may then be applied so that the flanges 48 are inside the inner walls of the side panels 22. The front panel 21 may then be applied to the structure with the flanges 41 lying internally of the inner side walls of the side panels 22. Welds may then be formed through the openings 54 and 56 from the exterior of the structure extending through to join the side panels to the flanges 41 and 48.

It will now be observed that each of the panels is separately fabricated as an independent complete unit prior to assembly of the several panels around the inner tank 12. The bottom panel 24 acts as a complete support for the inner tank 12. The side and end walls support no weight, their primary purpose being to resist the forces tending to bulge the inner storage tank when filled with liquid. Welding of the exterior shell to form a complete enclosure for the inner tank 12 is accomplished in a convenient and expeditious manner without disturbing the inner tank. Substantially all metal to metal contacts between the inner tank and the outer shell are avoided, resulting in a minimizing of losses through conduction. Since the insulation is applied to each of the panels and all panels are fully completed prior to assembly of the storage unit, welding of the bars 53, channels 52, the fitting of the cork and asbestos insulation and the application of plywood sheets may be accomplished when complete and convenient access to the panels is possible.

While we have shown and described the preferred form of our invention, it will be apparent that various changes and modifications may be made therein, particularly in the form and relation of parts, without departing from the spirit of our invention as set forth in the appended claims.

We claim:

1. An insulated storage tank comprising a substantially rectangular inner shell having a substantially V-shaped bottom, a supporting structure comprising a sheet of mild steel, a plurality of spaced structural members fastened to the upper surface of said sheet, insulating material disposed in the spaces between adjacent structural members, and a sheet of insulating material laid on the top surface of said structural members for prevention of metal to metal contact between said structural members and bottom of said inner shell, and legs for supporting said supoprting structure, said supporting structure being shaped to interfit with the V-shaped bottom of said inner shell for supporting the same and preventing lateral movement thereof, and a plurality of relatively light, non load bearing insulating panels adapted to be laid against the side and top walls of said inner shell for enclosing and insulating the same.

2. A storage tank as claimed in claim 1 wherein said non load bearing insulating panels comprise an outer member of thin sheet steel, a plurality of light structural steel stiffening members fastened to the inner surface of said outer member, insulating material fastened to said outer member between the adjacent structural members, and strips of relatively thin insulating material covering said structural members, and a sheet of insulating material laid against the inside surface of said panel for prevention of metal to metal contact between said panel and said inner shell.

References Cited in the file of this patent
UNITED STATES PATENTS

| | | |
|---|---|---|
| 494,916 | Curtis | Apr. 4, 1893 |
| 1,374,905 | Casey et al. | Apr. 19, 1921 |
| 1,832,919 | Taylor | Nov. 24, 1931 |
| 1,971,002 | Gray | Aug. 21, 1934 |
| 2,054,754 | Kellogg | Sept. 15, 1936 |
| 2,073,990 | Koch | Mar. 16, 1937 |
| 2,082,578 | Ingram et al. | June 1, 1937 |
| 2,116,020 | Gauvin | May 3, 1938 |
| 2,123,678 | Madden | July 12, 1938 |
| 2,158,274 | Collins | May 16, 1939 |
| 2,268,517 | Small | Dec. 30, 1941 |
| 2,295,103 | Friedly | Sept. 8, 1942 |
| 2,341,740 | Penney | Feb. 15, 1944 |
| 2,371,347 | Morrow | Mar. 13, 1945 |
| 2,714,516 | Brown | Aug. 2, 1955 |